(12) United States Patent
Mendenhall et al.

(10) Patent No.: US 12,736,755 B2
(45) Date of Patent: Sep. 15, 2026

(54) ULTRA-SMALL FORM FACTOR FIBER OPTIC CONNECTOR AND ADAPTER WITH STUBBING PREVENTION FEATURES

(71) Applicant: US Conec Ltd., Hickory, NC (US)

(72) Inventors: Scott Mendenhall, Hickory, NC (US); Darrell R. Childers, Hickory, NC (US); Jason Higley, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 273 days.

(21) Appl. No.: 18/473,981

(22) Filed: Sep. 25, 2023

(65) Prior Publication Data

US 2024/0103230 A1 Mar. 28, 2024

Related U.S. Application Data

(60) Provisional application No. 63/410,065, filed on Sep. 26, 2022.

(51) Int. Cl.
*G02B 6/38* (2006.01)
*G02B 6/40* (2006.01)

(52) U.S. Cl.
CPC ......... *G02B 6/3825* (2013.01); *G02B 6/3882* (2013.01); *G02B 6/406* (2013.01)

(58) Field of Classification Search
None
See application file for complete search history.

(56) References Cited

U.S. PATENT DOCUMENTS 6,572,276 B1 6/2003 Theis et al.
10,678,000 B2 * 6/2020 Takano ................ G02B 6/3893
11,016,251 B2 * 5/2021 Childers .............. G02B 6/3857
11,112,566 B2 * 9/2021 Takano ................ G02B 6/3878
2004/0052472 A1 * 3/2004 Roth .................... G02B 6/3885 385/59
2004/0141693 A1 * 7/2004 Szilagyi ............... G02B 6/3849 385/55
2007/0098329 A1 * 5/2007 Shimoji ............... G02B 6/3893 385/60
2009/0046981 A1 * 2/2009 Margolin ............. G02B 6/3825 385/70
2013/0259429 A1 * 10/2013 Czosnowski ........ G02B 6/3879 385/78
2014/0314379 A1 * 10/2014 Lu ........................ G02B 6/3879 385/72
2016/0091671 A1 * 3/2016 Nguyen ............... G02B 6/3893 385/81
2016/0161680 A1 * 6/2016 Nguyen ............... G02B 6/3881 385/59
2020/0257063 A1 * 8/2020 Takano ................ G02B 6/3893
2021/0247572 A1 * 8/2021 Ho ....................... G02B 6/3849
2022/0146757 A1 * 5/2022 Nguyen ............... G02B 6/3831
2022/0196919 A1 * 6/2022 Hendrick ............... G02B 6/406
2023/0096618 A1 * 3/2023 Childers .............. G02B 6/3857 385/134
2024/0053549 A1 * 2/2024 Takano .............. G02B 6/38875
2025/0060539 A1 * 2/2025 Chang .................. G02B 6/3825
2025/0180829 A1 * 6/2025 Chang .................. G02B 6/3831

* cited by examiner

*Primary Examiner* — Jerry Rahll

(57) ABSTRACT

A modified housing and adapter prevent unwanted contact during the mating of fiber-optic connectors by using positive features and negative features in the housing, while the modified adapter presents negative features and positive features in mating of the two structures.

18 Claims, 14 Drawing Sheets

ULTRA-SMALL FORM FACTOR FIBER OPTIC CONNECTOR AND ADAPTER WITH STUBBING PREVENTION FEATURES

REFERENCE TO RELATED CASE

This application claims priority under 35 U.S.C. § 119 (e) to U.S. provisional application No. 63/410,065 filed on Sep. 26, 2022, the contents of which are hereby incorporated by reference in their entirety.

BACKGROUND OF THE INVENTION

Various ultra-small form factor ("USFF") fiber optic connectors ("connectors") are being introduced in the market in response to high density fiber optic interconnect platform demands. Another term used for such small form factor is "Very Small Form Factor" or "VSFF." One such connector is the SN-MT fiber-optic connector provided by Senko Advanced Components, Inc. of Massachusetts. This connector, shown for example, in FIG. 1 is typically mated to another similar connector inside a conventional adapter, such as the SN-MT adapter shown in FIG. 2. This conventional adapter may be sized for as many as four such connectors on each side (i.e., a total of up to 8 connectors). See FIG. 3. This connector includes a multi-fiber ferrule with two guide pins to mate with a corresponding female SN-MT fiber-optic connector inside the adapter. A duplex version of the fiber-optic connector in the same footprint is the conventional SN fiber-optic connector with two LC-type ferrules. See FIG. 4, and also another similar duplex fiber-optic connector in U.S. Pat. No. 6,572,276 to Euromicron Werkzeuge GmbH ("the '276 patent").

However, Applicant has identified that in the current forms available in the market, the metallic guide pins of the SN-MT fiber-optic connector may stub the end face of the ferrule in the opposing/mating connector, or latches/surfaces inside the adapter, when the SN-MT connector is inserted into the adapter. In the case of a duplex connector, the same problem exists with the LC-type ferrules stubbing various surfaces. This occurs because, in its current form, the SN/SN-MT fiber-optic connector does not have reliable guidance into the adapter and can be mis-oriented inside the adapter during the insertion process. See FIG. 5A where a picture of the SN fiber-optic connector is shown to be at an angle inside the adapter, which leads to stubbing as the connector is inserted further into the adapter. FIG. 5B shows a top view of the same problem where the fiber-optic connector should not be at an angle to the longitudinal axis or to the Z-axis in the mating/unmating direction. The ferrules touch adapter sleeves from a port different from the one that the fiber-optic connector was intended for, and the fiber-optic connector can easily be moved laterally and angularly inside the adapter, which can cause damage to the ferrules, the adapter, or both, eventually resulting in a failed optical connection.

For example, the SN fiber-optic connector has a polarity key on the top or bottom side of the outer housing. The key is used for guidance into the adapter, but is located substantially far from a front end of the fiber-optic connector due to a required latch receptacle at a front end of the fiber-optic connector. Due to its distant location from the front end, the fiber-optic connector has opportunities to move about laterally inside the adapter until the guidance from the key kicks in, which may not even happen if the fiber-optic connector is substantially mis-positioned already. Thus, there is a substantial risk of pin stubbing or ferrule stubbing in such fiber-optic connectors, which affects optical connectivity.

Thus, Applicant has provided new designs to address these and other problems in certain small form factor connector formats. Some of the features to avoid such stubbing issues are on the fiber-optic connector, while some may be inside the adapter. These features on the adapter and the fiber-optic connector will work together to align or position the fiber-optic connector such that the pin or ferrule stubbing issues are avoided. It will be appreciated that in the specific embodiments illustrated below, reference to the SN fiber-optic connector will also imply a reference to the SN-MT fiber-optic connector, although similar fiber-optic connectors other than the SN or the SN-MT fiber-optic connector are within the scope of this disclosure, as will be appreciated by one of ordinary skill in the art after reading this disclosure. Of course, the SN fiber-optic connector or other duplex connectors will have the issue of ferrule stubbing, whereas the SN-MT fiber-optic connector or other multi-fiber fiber-optic connectors of VSFF formats will have the issue of pin stubbing. This disclosure addresses prevention of both these issues in both types of fiber-optic connectors—SN and SN-MT. There is also an optical assembly having a modified adapter to prevent stubbing and at least a pair of USFF/VSFF fiber-optic connectors mating at the adapter.

SUMMARY OF THE INVENTION

According to one aspect, the present invention is directed to an optical assembly with stubbing prevention features for ultra-small form-factor (USFF) fiber-optic connectors or very small form-factor (VSFF) fiber-optic connectors, the optical assembly includes a first USFF or VSFF fiber optic connector having at least one ferrule at least partially disposed inside the first USFF or VSFF fiber optic connector, second USFF or VSFF fiber optic connector having at least one ferrule partially disposed inside the second USFF or VSFF fiber optic connector opposite the first USFF or VSFF fiber optic connector, one of the first USFF or VSFF fiber optic connector and second USFF or VSFF fiber optic connector having guide pins, and an adapter having at least two ports on each of a first side and a second side of the adapter to mate at least one pair of USFF or VSFF fiber optic connectors, a first port of the at least two ports on the first side receiving the first USFF or VSFF fiber optic connector and a first port of the at least two ports on the second side receiving the second USFF fiber optic connector for mating, and a second port of the at least two ports being side-by-side with the first port, respectively, on each of the first side and the second side, wherein each of the first USFF or VSFF fiber optic connector and the second USFF or VSFF fiber optic connector has a top wall and a bottom wall separated by opposing side walls, at least one of the top wall and the bottom wall having a first flat surface extending upward from one of the side walls and a second flat surface extending upward from the other of the side walls, the first flat surface and the second flat surface being parallel to and offset from one another, wherein at least one of the top wall and the bottom wall has a third flat surface and a fourth flat surface, the third flat surface and the fourth flat surface being parallel to and offset from one another and disposed between the first flat surface and the second flat surface, and wherein at least one of the flat surfaces engages a corresponding surface in the adapter to prevent unwanted engagement of end faces or guide pins of the at least one ferrule of the first USFF or VSFF fiber optic connector and the second USFF or VSFF fiber optic connector disposed within the adapter.

In some embodiments, each of the first USFF or VSFF fiber optic connector and the second USFF or VSFF fiber optic connector is always positioned within the first port on the first side and the second side, respectively, until the mating of the first USFF or VSFF fiber optic connector and the second USFF or VSFF fiber optic connector.

In some embodiments, the third flat surface and the fourth flat surface are on a polarity key extending upward from one of the top wall and the bottom wall.

In some embodiments, the flat surfaces extend from both the top wall and the bottom wall.

In some embodiments, the at least two ports on each of the first side and the second side of the adapter each have at least two flat surfaces within a central opening of the adapter to engage at least two of the flat surfaces on the USFF fiber-optic connector or the VSFF fiber-optic connector.

In some embodiments, the at least two flat surfaces within a central opening of the adapter to engage at least two of the flat surfaces on the USFF fiber-optic connector or the VSFF fiber-optic connector are on guide partitions extending from the top wall and bottom wall.

In some embodiments, the USFF fiber-optic connector or the VSFF fiber-optic connector engage a latch disposed within the adapter before the guide pins or front faces of the respective at least one ferrule of each of the USFF fiber-optic connector or the VSFF fiber-optic connector mate with one another.

In yet another aspect, there is an fiber optic connector, the fiber optic connector being an ultra-small form-factor (USFF) fiber-optic connector or very small form-factor (VSFF) fiber-optic connector that includes a top wall, a bottom wall, opposing side walls that separate the top wall from the bottom wall, wherein at least one of the top wall and the bottom wall having a first flat surface extending upward from one of the side walls and a second flat surface extending upward from the other of the side walls, the first flat surface and the second flat surface being parallel to and offset from one another, and wherein at least one of the top wall and bottom wall has a third flat surface and a fourth flat surface, the third flat surface and the fourth flat surface being parallel to and offset from one another and disposed between the first flat surface and the second flat surface, wherein at least one of the flat surfaces engages a corresponding surface in an adapter to prevent unwanted engagement of end faces or guide pins of an at least one ferrule of the first USFF or VSFF fiber optic connector and the second USFF or VSFF fiber optic connector disposed within the adapter.

In some embodiments, the third flat surface and a fourth flat surface are on a polarity key extending upward from one of the top wall and the bottom wall.

In some embodiments, the flat surfaces extend from both the top wall and the bottom wall.

In yet another aspect, there is an optical assembly with stubbing prevention features for ultra-small form-factor (USFF) fiber-optic connectors or very small form-factor (VSFF) fiber-optic connectors, the optical assembly includes an adapter having at least one port to mate at least one pair of USFF or VSFF fiber optic connectors, the adapter having one of a projection and a receiver to prevent stubbing, a first USFF or VSFF fiber optic connector having at least one ferrule at least partially disposed inside the first USFF or VSFF fiber optic connector, and a second USFF or VSFF fiber optic connector having at least one ferrule partially disposed inside the adapter opposite the first USFF or VSFF fiber optic connector, wherein each of the first USFF or VSFF fiber optic connector and the second USFF or VSFF fiber optic connector has the other of the projection and the receiver to prevent stubbing to prevent unwanted engagement of the end faces or guide pins of the at least one ferrule of the first USFF or VSFF fiber optic connector and the second USFF or VSFF fiber optic connector disposed within the adapter.

In some embodiments, the adapter has a central wall with openings for at least a portion of the at least one ferrule, respectively, of each of the pair of USFF or VSFF fiber optic connectors to pass therethrough.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
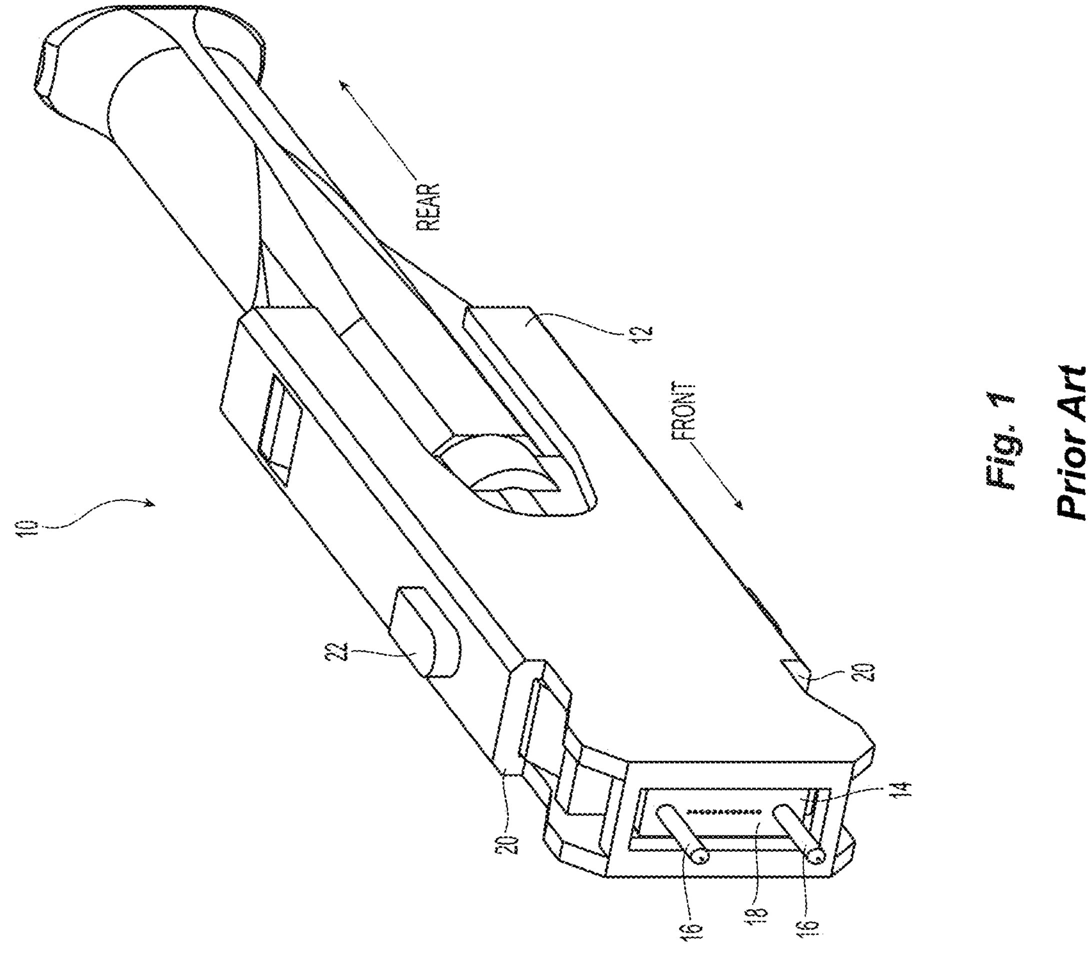
FIG. 1 is a perspective view of an SN-MT fiber-optic connector.

Reference will now be made in detail to the present preferred embodiment(s) of the invention, examples of which are illustrated in the accompanying drawings. Whenever possible, the same reference numerals will be used throughout the drawings to refer to the same or like parts.

Illustrated in FIG. 1 is an SN-MT fiber-optic connector 10 with a housing 12 and a multi-fiber ferrule 14 that has guide pins 16 extending out of and beyond the front face 18. The housing 12 has a latch receptacle 20 on both sides of the fiber-optic connector 10 at a front end. The housing 12 may also have a key 22 that prevents the fiber-optic connector 10 from being inserted incorrectly. There may be such a key 22 on both sides of the fiber-optic connector 10. The fiber-optic connector 10 may generally be referred to as an Ultra-Small Form Factor (USFF) or a Very Small Form Factor (VSFF) fiber-optic connector (hereinafter "connector") in the industry. Such USFF or VSFF connectors may have two LC-type single fiber ferrules (duplex version or SN) or a single MT-like multi-fiber ferrule (multi-fiber version or SN-MT).

Applicant notes that the term "front" or "forward" means that direction where the fiber optic ferrule would meet with another fiber optic ferrule or device, while the term "rear" or "rearward" is used to mean the direction from which the optical fibers enter into the fiber-optic ferrule or fiber optic connector. In the present application, the fiber-optic connector 10 will therefore have a front and a rear, the front will be inserted into an adapter 50 like in FIG. 2 or another receptacle. Thus, in FIG. 1, the "front" of the fiber-optic connector 10 is on the left side of the figure and pointing out of the figure. The "rear" or "back" is that part of the fiber-optic connector 10 is on the right side of the page and "forward is toward the left and out of the page while "rearward" and "backward" is toward the right and into the page.

Figure 2:
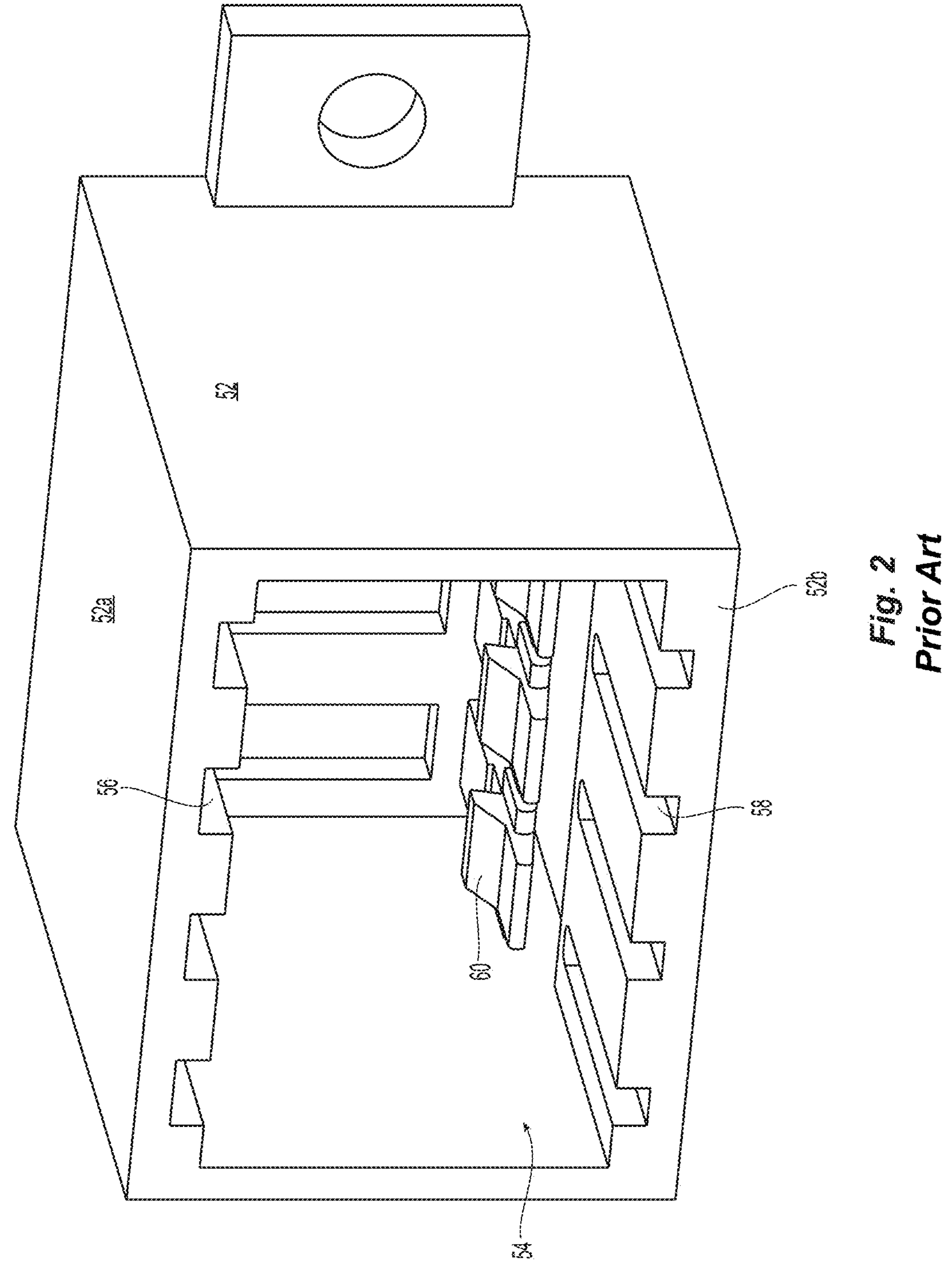
FIG. 2 is a perspective view of an adapter for the SN-MT fiber-optic connector in FIG. 1.
Figure 3:
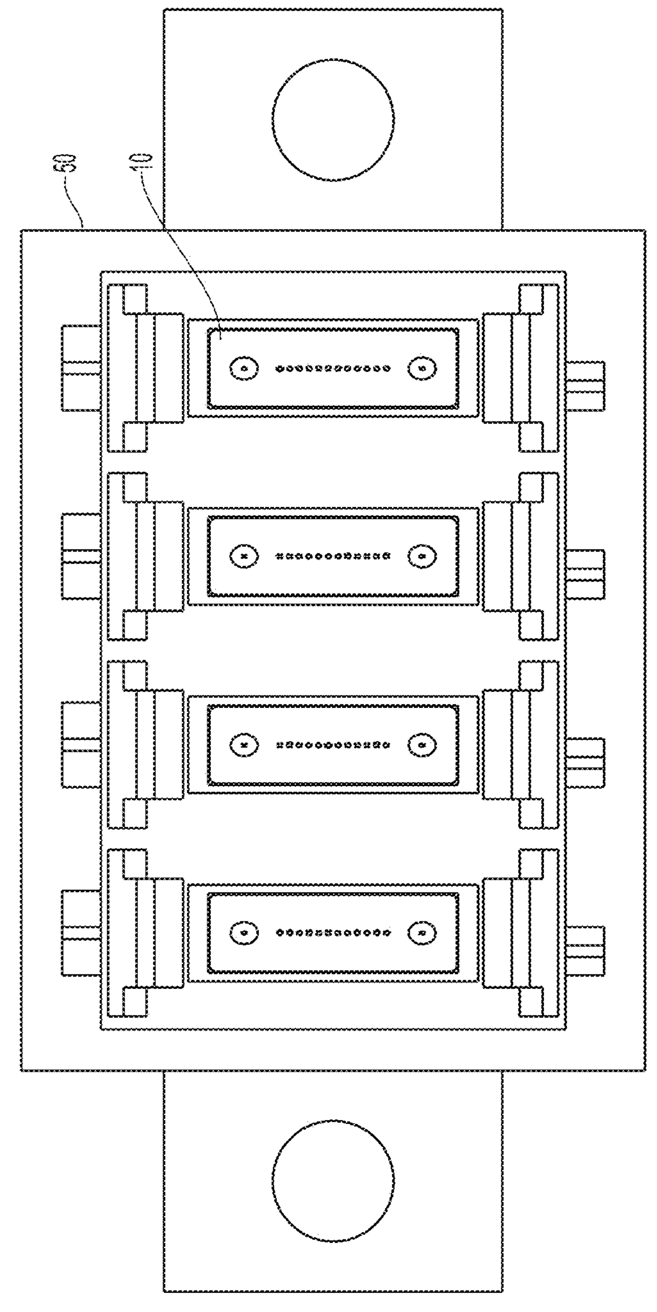
FIG. 3 is a front elevational view of the SN-MT adapter of FIG. 2 with opposite side mating SN-MT fiber-optic connectors from FIG. 1 installed therein.

One adapter 50 for the SN-MT fiber-optic connector 10 in FIG. 1 is illustrated in FIG. 2. The adapter has walls 52 that define an opening 54 into which the fiber-optic connector 10 is inserted. The top wall **52*a* has internal grooves 56 to receive the key 22. The bottom wall 52*b* also has internal grooves 58 that receive another key 22 or a different projection from the housing 12. In the back of the adapter 50 are latches 60 on the top and bottom of the opening 54 to engage and retain the fiber-optic connector 10 in the adapter 50. As is known to one of skill in the art is that there may be two adapters 50 that are mated to one another to allow fiber-optic connectors 10 to be inserted from the front and also the back (not shown), or alternatively, there may be a single unitary molded piece forming the adapter 50. As can be recognized, as the fiber-optic connector 10 is inserted into the opening 54, the first part of the fiber-optic connector 10 that engages the adapter 50 is the key 22. With the key 22 being so far back from the front end of the fiber-optic connector 10, there are plenty of chances for the fiber-optic connector 10 to engage other fiber-optic connectors (see FIG. 3) or other parts or ports of the adapter (see FIGS. 5A and 5B) before the key 22 is to engage the internal grooves 56,58. The adapter 50 has four ports or spaces (each port having a pair of internal grooves 56/58) to receive the fiber optic connectors 10 with the housing 12**.

Figure 4:
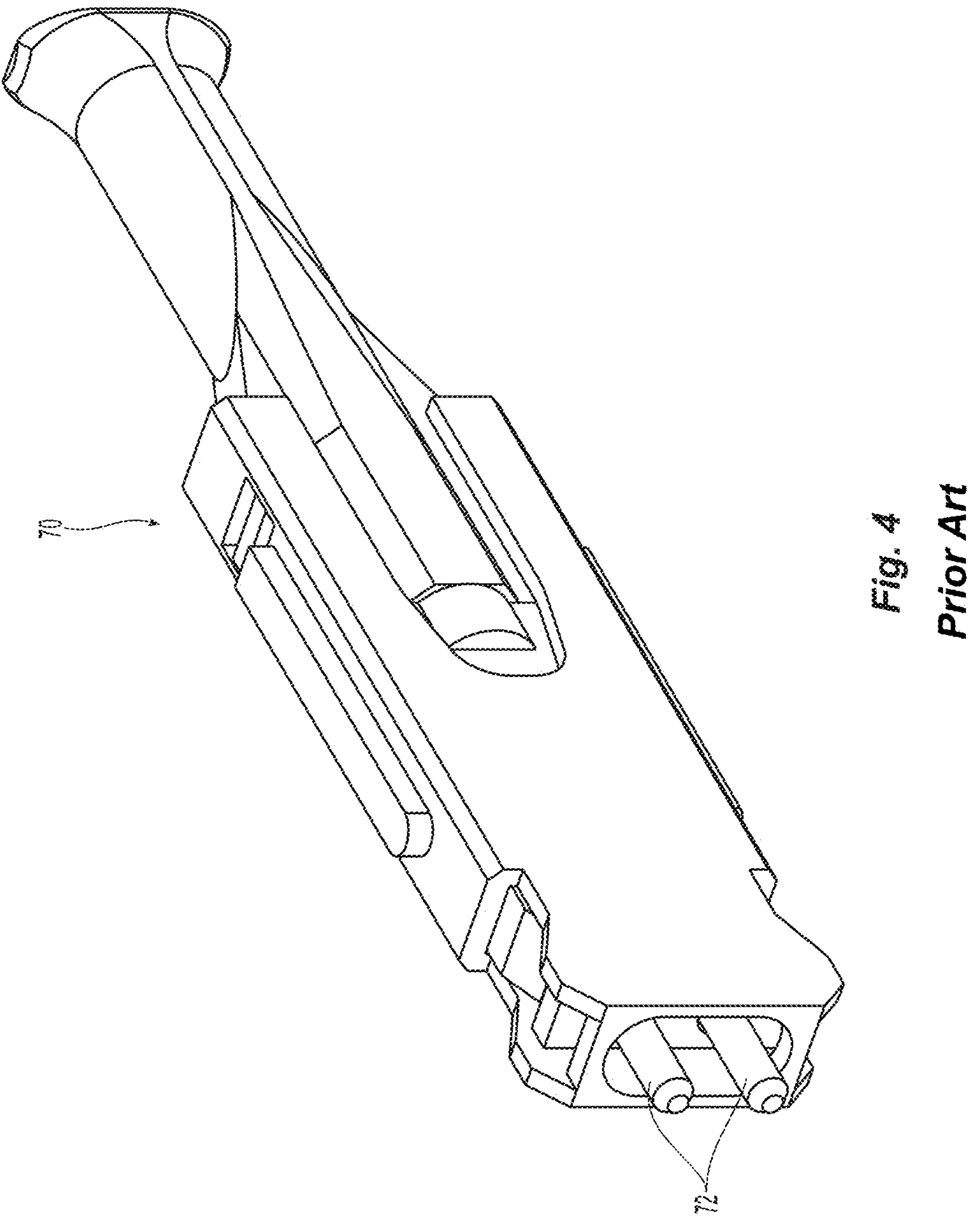
FIG. 4 is a perspective view of a duplex version of the SN fiber-optic connector with LC-type ferrules installed therein, also known as the SN® brand connector from Senko Advanced Components, of Massachusetts.
Figure 5A:
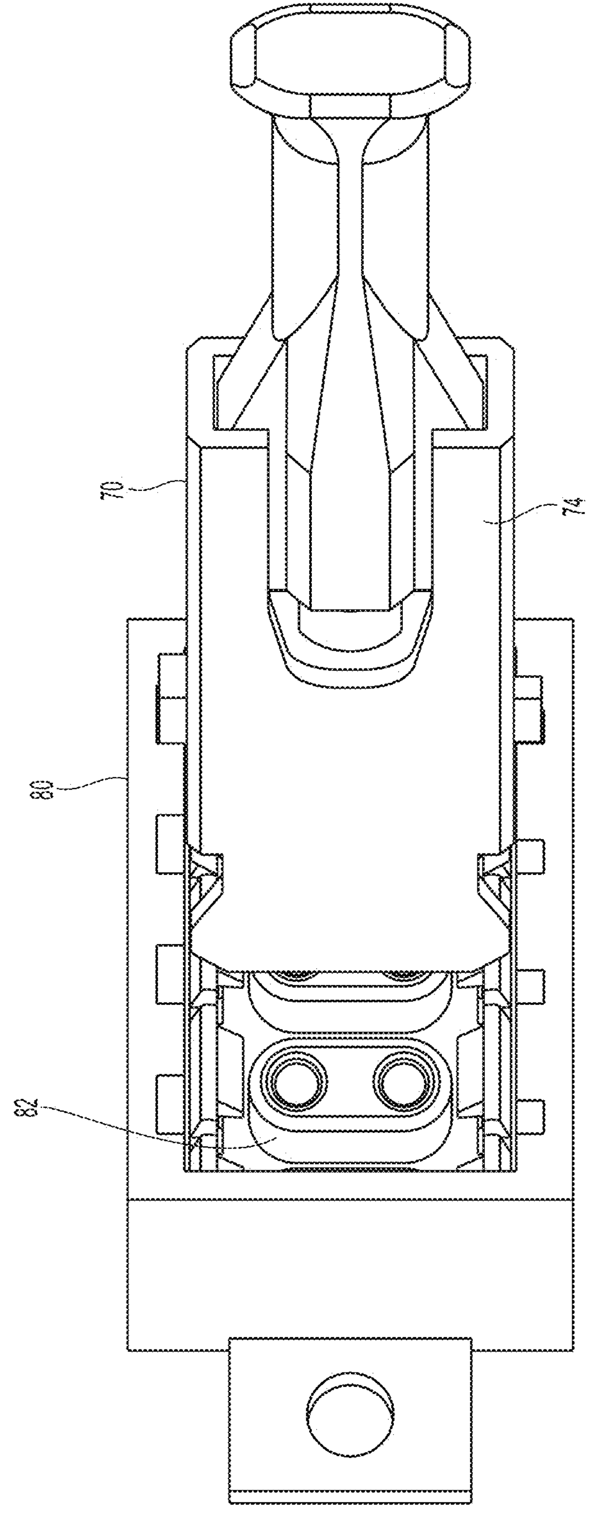
FIG. 5A is a perspective view of the SN fiber-optic connector stubbing in an adapter.
Figure 5B:
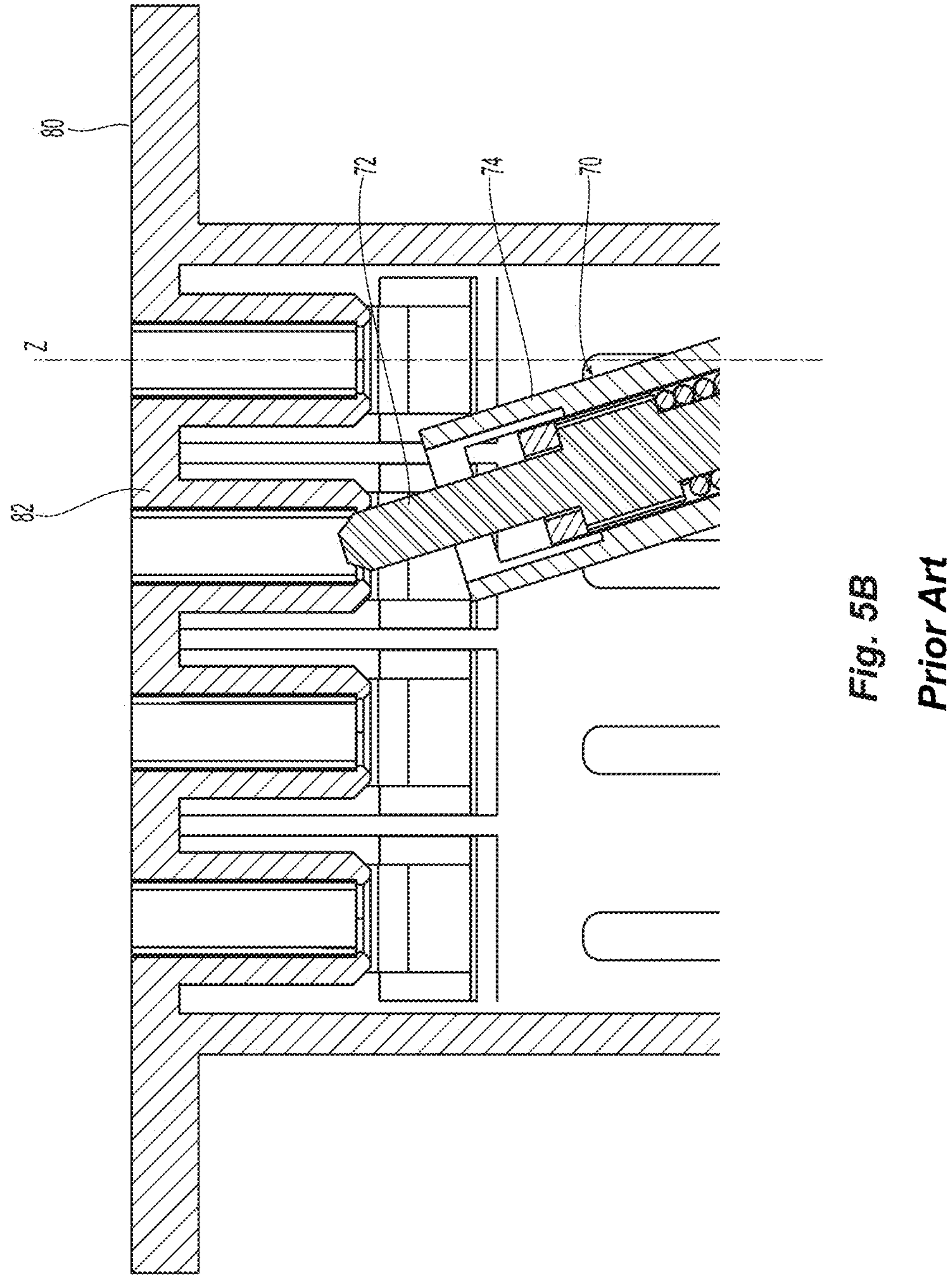
FIG. 5B is a top cross section view of the SN connector stubbing the ferrule in a connector sleeve in the fiber-optic connector.

Another version of a duplex version of the SN-MT fiber-optic connector 70 with LC-type ferrules is illustrated in FIG. 4. This connector 70 is also known as the SN connector in the industry. In this case, rather than a single, multi-fiber ferrule, there are two LC-type ferrules 72 and the connections and parts are otherwise the same as that of the fiber optic connector 10. As is known in the art, there are typically LC sleeves in the adapter or other receptacle that receives the fiber-optic connector 70. This is illustrated in FIGS. 5A and 5B.

An adapter 80 is to receive the fiber-optic connector 70 in one of the 4 ports. The adapter 80 has sleeves 82 to receive the two LC-type ferrules 72. Again, structures on the housing 74 of the fiber-optic connector 70 engage the adapter 80. However, those structures in the conventional SN/SN-MT connector are too far toward the rear of the fiber-optic connector 70 relative to the distance from the front face of the adapter to the ferrule mating plane, which results in the fiber-optic connector 70 to engage parts of the adapter 80 rather than the sleeves 82. In FIG. 5B the fiber-optic connector 70 is to be inserted into the right-most port, but it is hitting the sleeves 82 in the second port from the right. This can damage the fiber-optic connector 70, the sleeves 82, the adapter 80, the fiber-optic ferrules 72, or another the fiber-optic connector.

Figure 6:
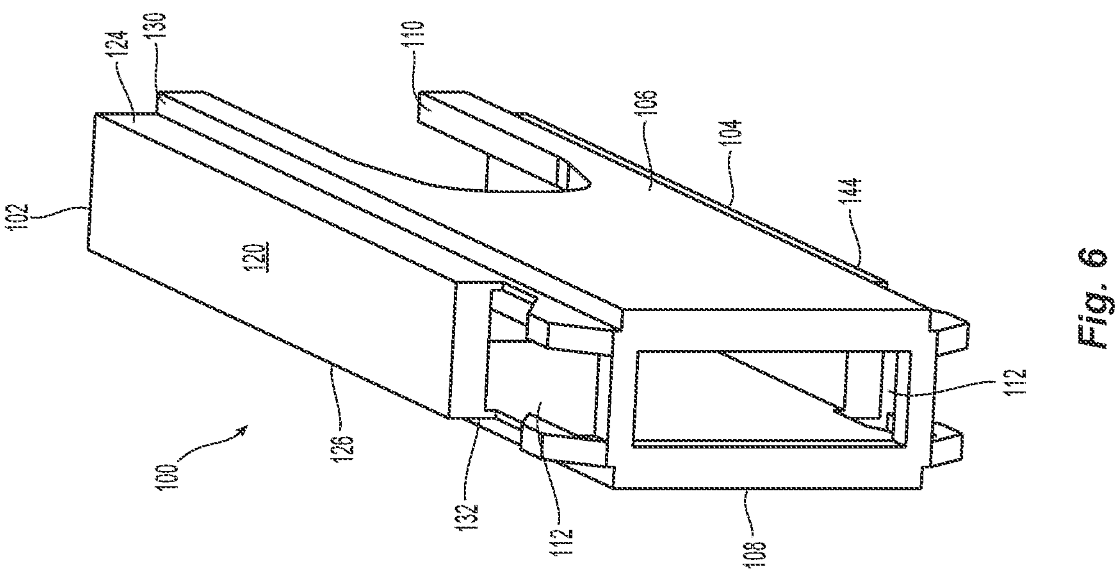
FIG. 6 is a perspective view of one embodiment of a modified housing for a SN-MT type fiber-optic connector according to the present invention.

Turning now to an example embodiment of the present invention, there is shown in FIG. 6 one embodiment of a housing 100 for an ultra-small form-factor (USFF) fiber-optic connector or very small form-factor (VSFF) fiber-optic connector. The ferrules (either multi-fiber or LC-type), a spring, a spring push, and other components of a fiber optic connector (including optical fibers) have been removed for clarity. The housing 100 has a top wall 102, a bottom wall 104, and opposing side walls 106,108 that separate the top wall 102 from the bottom wall 104. The housing 100 may have other features, like the cut-outs 110 in each of the opposing side walls 106,108. There is also the latch receptacle 112 on both sides of the housing 100. The top wall 102 and the bottom wall 104 each have a width that is less than a height of the housing 100 in the orientation shown in FIG. 6.

Figure 7:
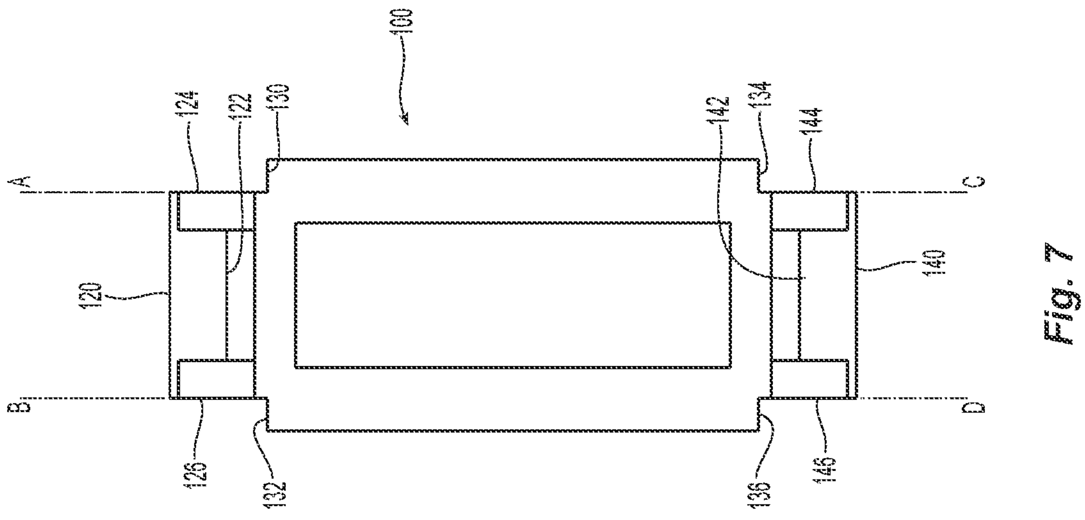
FIG. 7 is a front elevational view of the modified housing in FIG. 6.

The top wall 102 and the bottom wall 104 are preferably the same, as noted below. The top wall 102 extends upward from each of the side walls 106,108, and has a top surface 120, a bottom surface 122, a first side surface 124, and a second side surface 126. Each of the top surface 120, the bottom surface 122, the first side surface 124, and the second side surface 126 are flat surfaces. The first side surface 124 and the second side surface 126 each lie in a respective plane—plane A for the first side surface 124 and plane B for the second side surface 126. The first side surface 124 and the second side surface 126 extend upward from the side walls 106,108 and are parallel and offset from one another. See FIG. 7. The top wall 102 (and thus the top surface 120) is disposed directly behind the latch receptacles 112.

The bottom wall 104 extends downward (away) from each of the side walls 106,108, and has a top surface 140, a bottom surface 142, a first side surface 144, and a second side surface 146. The first side surface 144, and the second side surface 146 are flat surfaces—that is they each lie in a respective plane—plane C for the first side surface 144 and plane D for the second side surface 146. Planes A and C are preferably the same, as are planes B and D. However, planes A and C as well as planes B and D could be parallel to but offset from one another.

The top wall 102 is offset in an inward/lateral direction from the first side wall 106 and also in an inward/lateral direction from second side wall 108 thereby creating on each side of the top wall 102 a shoulder or guide rail 130, 132. That is, a width of the top wall 102 is less than a lateral separation between the first side wall 106 and the second side wall 108. The guide rails 130,132 are used in conjunction with corresponding structures in an adapter to locate the housing therein. There are also guide rails 134, 136 that are formed in the same way with the bottom wall 104.

Figure 8:
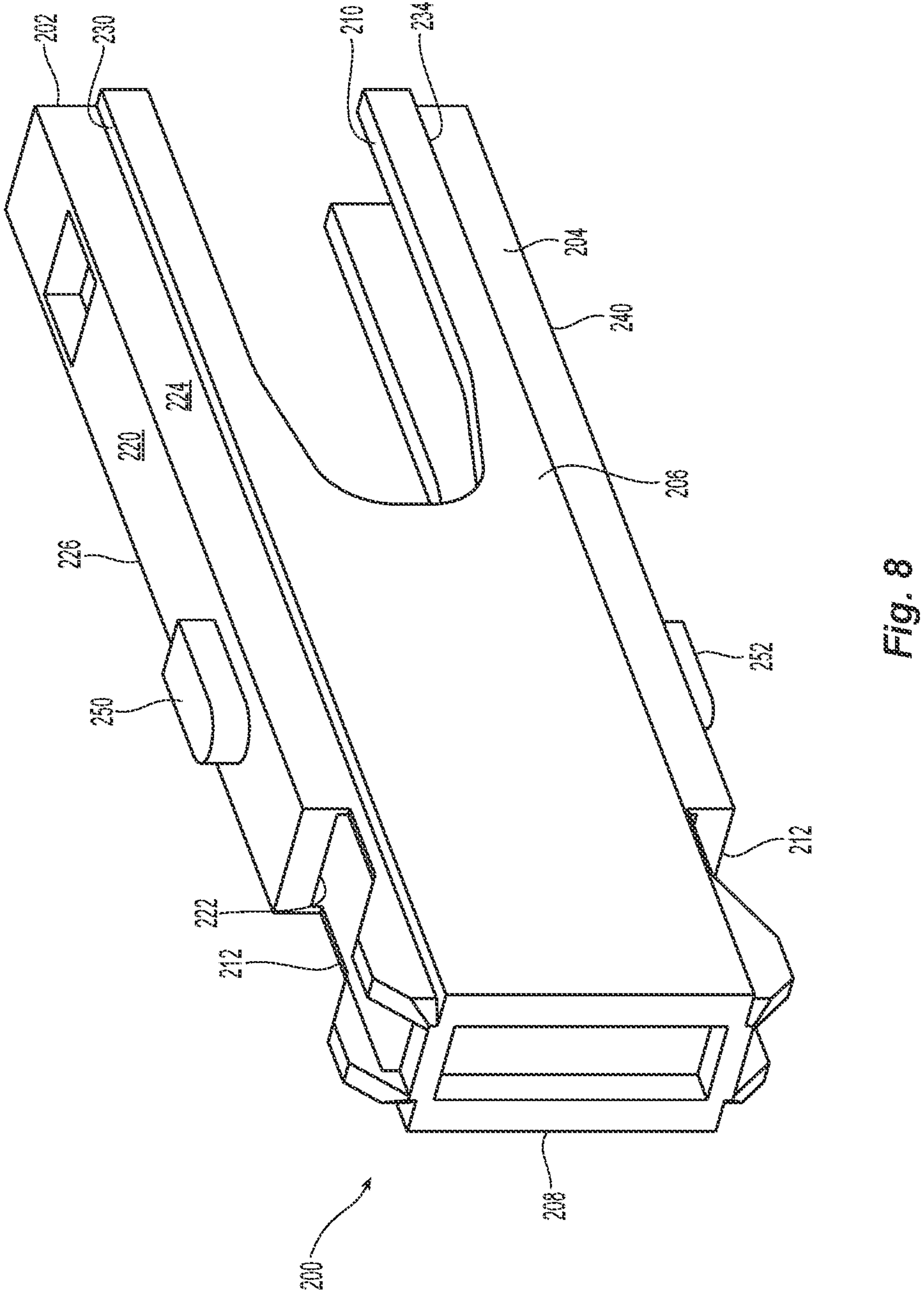
FIG. 8 is a side perspective view of another embodiment of a modified housing for a SN-MT type fiber-optic connector according to the present invention.
Figure 9:
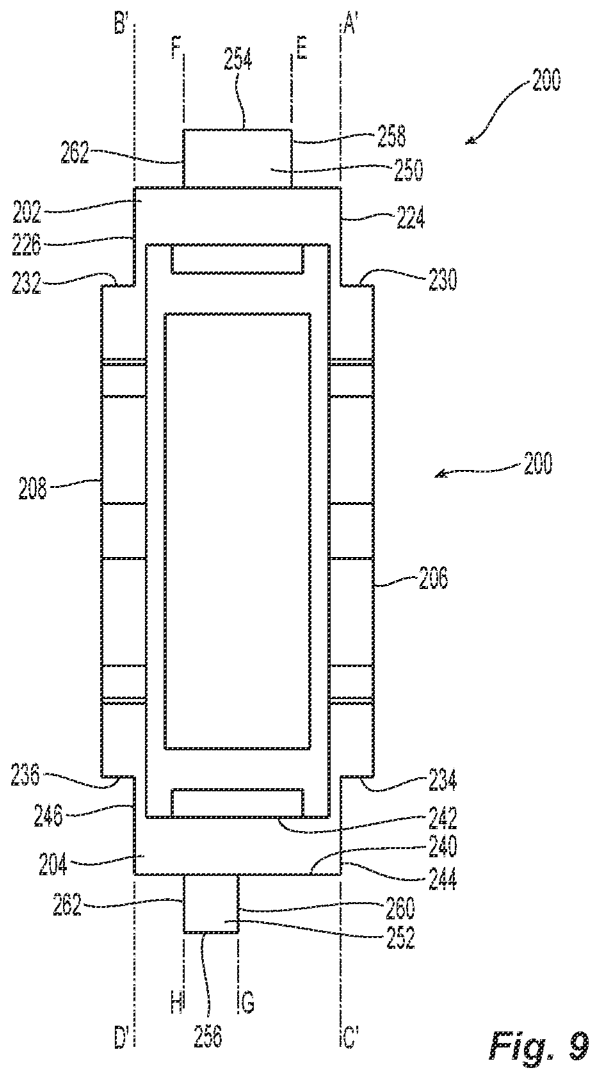
FIG. 9 is a front elevational view of the modified housing in FIG. 8.

FIGS. 8 and 9 illustrate another embodiment of a housing 200 according to the present invention. The housing 200 has a top wall 202, a bottom wall 204, and opposing side walls 206,208 that separate the top wall 202 from the bottom wall 204. The housing 200 may have other features, like the cut-outs 210 in each of the opposing side walls 206,208. There is also the latch receptacle 212 on both sides of the housing 200. Again, top wall 202 and the bottom wall 204 each have a width that is less than a height of the housing 200 in the orientation shown in FIG. 8.

The top wall 202 and the bottom wall 204 are preferably the same. The top wall 202 extends upward from each of the side walls 206,208, and has a top surface 220, a bottom surface 222, a first side surface 224, and a second side surface 226. Each of the top surface 220, the bottom surface 222, the first side surface 224, and the second side surface 226 are flat surfaces. The first side surface 224, and the second side surface 226 each lie in a respective plane—plane A' for the first side surface 224 and plane B' for the second side surface 226. The first side surface 224 and the second side surface 226 extend upward from the side walls 206,208 and are parallel and offset from one another. See FIG. 9. The top wall 202 (and thus the top surface 220) is disposed directly behind the latch receptacles 212.

The bottom wall 204 extends downward (away) from each of the side walls 206,208, and has a top surface 240, a bottom surface 242, a first side surface 244, and a second side surface 246. The first side surface 244, and the second side surface 246 are flat surfaces. that is they each lie in a respective plane—plane C' for the first side surface 244 and plane D' for the second side surface 246. Planes A' and C' are preferably the same, as are planes B' and D.' However, planes A' and C' as well as planes B' and D' could be parallel to but offset from one another.

The top wall 202 is offset in an inward/lateral direction from the first side wall 206 and also in an inward/lateral direction from the second side wall 208, thereby creating on each side of the top wall 102 a shoulder or guide rail 230,232. The guide rails 230,232 are used in conjunction with corresponding structures in an adapter to locate the housing therein. There are also guide rails 234, 236 that are formed in the same way with the bottom wall 204. It should be noted that the guide rails may only be on one of the top and bottom of the housings 100 and 200.

The housing 200 also has a polarity key 250 that is disposed on the top surface 220. There may also be a polarity key 252 that is also disposed on the bottom surface 240 or the polarity key 252 may be the only polarity key. See FIG. 9. Each of the polarity keys 250/252 has a top surface 254/256, a first side surface 258/260, a second side surface 262/264, the first and second side surfaces being flat and extending from the top surface 220 and the bottom surface 240, respectively. For polarity key 250, the first side surface 258 lies in a plane E and the second side surface 262 lies in a plane F. Planes E and F are parallel to but offset from one another. Similarly, for the polarity key 252, the first side surface 260 lies in a plane G and the second side surface 264 lies in a plane H. Planes E-H are all parallel to one another. The planes on polarity key 250 may be aligned with the planes for polarity key 252, or they may offset from each other.

With the top wall 102 and the bottom wall 104 directly behind the latch receptacle 112, the housing 100 (the top wall 102 and the bottom wall 104 in particular) engages an adapter or other receptacle much sooner than the prior or conventional versions of the SN/SN-MT connectors (see FIGS. 1 and 4).

Figure 10:
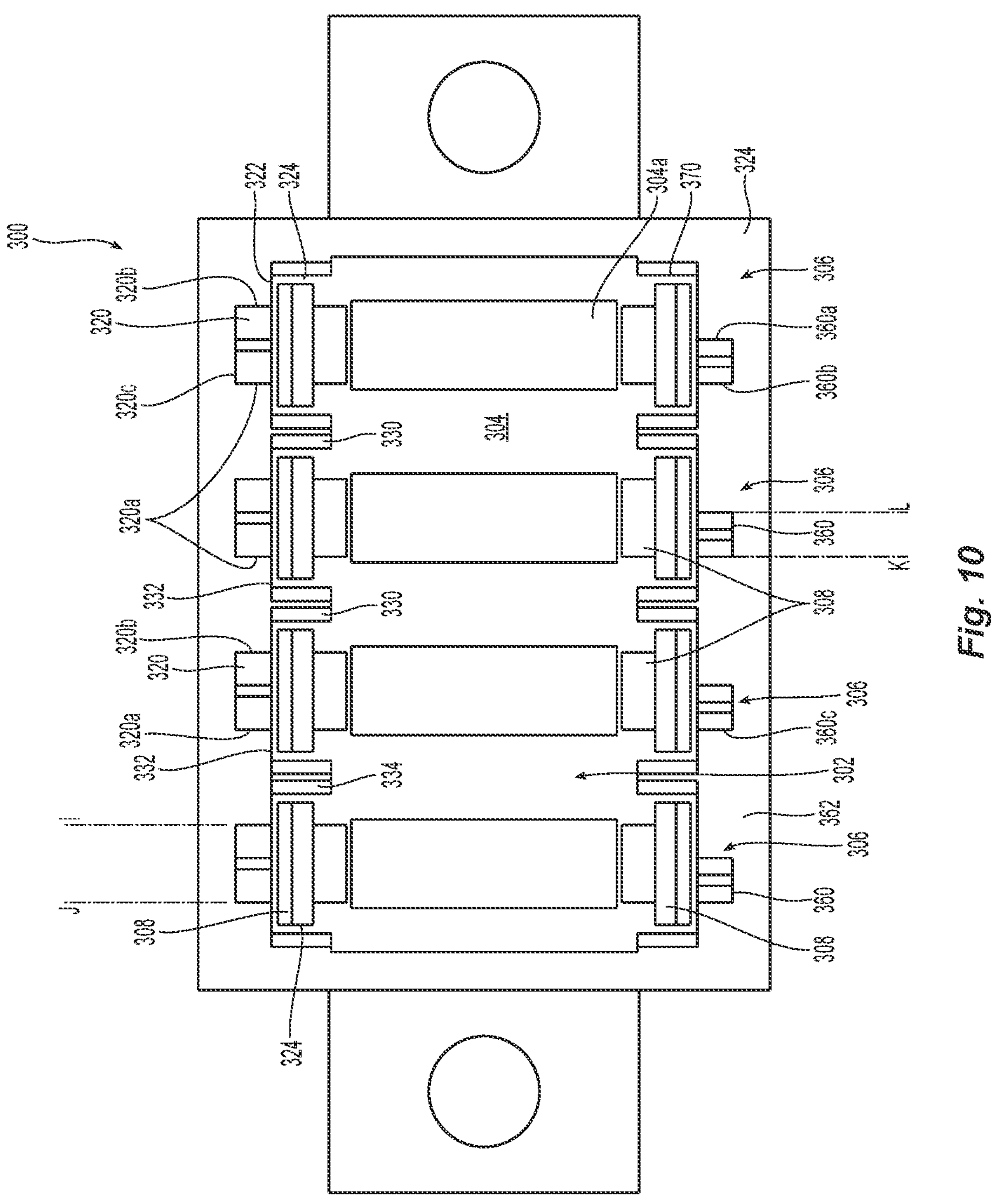
FIG. 10 is a front view of one embodiment of an adapter for the modified housing for a SN-MT type fiber-optic connector according to the present invention.
Figure 11:
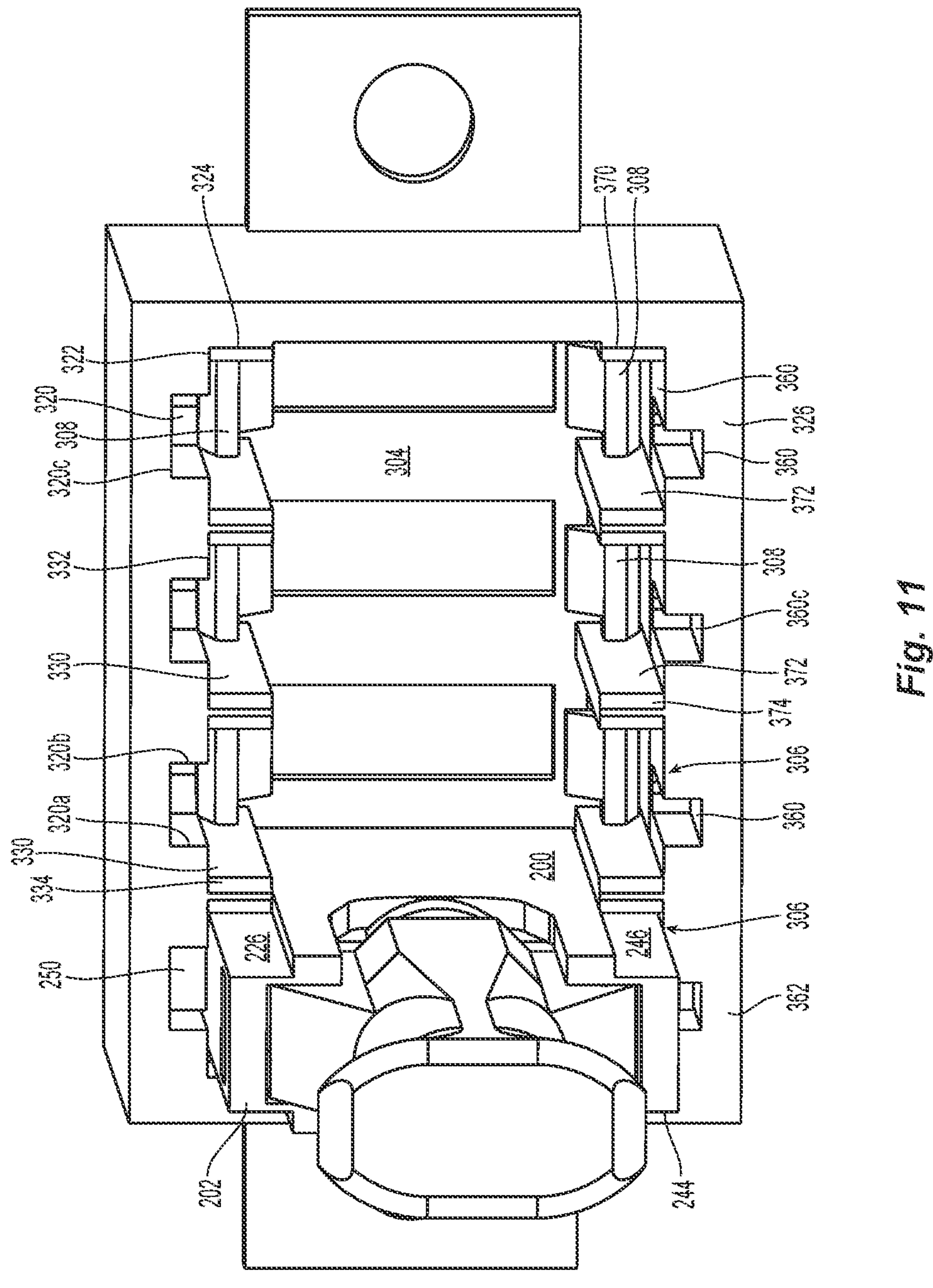
FIG. 11 is a perspective view of the adapter in FIG. 10 with a fiber-optic connector with the modified housing inserted in one of the ports in the adapter.

Turning to FIGS. 10 and 11, there is a modified adapter 300 to receive housings 100,200 (along with the remainder of the connector) in an interior portion 302. There is a central wall 304 at the back or rear of the adapter 300. Alternatively, the central wall 304 may be in a central portion of the adapter 300, in which case, an opposite side of the adapter 300 behind the central wall in FIGS. 10 and 11 will have features similar to the features shown in FIGS. 10 and 11 for the opposite mating connectors. It is also possible that the central wall 304 is smaller with at least two cut-outs rather than the four individual cut outs 304*a* illustrated in the figures. There may be more than four cut-outs 304*a* in some larger variations of the adapter 300. It is also possible that there is no central wall 304. It will be recognized by those of skill in the art that the adapter 300 is one half of a complete adapter and there is an identical one facing in the direction opposite and attached adjacent to the central wall 304. Therefore, the discussion of adapter 300 would apply to this second adapter, although the second adapter may be unitarily molded together with the adapter 300. As with the prior adapter 50, there are four ports 306 (and at least two ports) to receive four housings 100,200 in the adapter 300. See also FIG. 3. The interior portion 302 has latches 308 on the top and bottom of each of the ports 306 to mate with the latch receptacles 112,212 on the housings 100, 200, respectively.

There are grooves or slots 320 in the top wall 322 of the adapter 300 that extend from the front 326 of the adapter 300 rearward toward the central wall 304. The grooves 320 need not extend all the way to the central wall 304, but they may. These grooves 320 are to receive the polarity keys 250 on housings 200. Even if there were no polarity keys 250 on the housings (e.g. housing 100), there is no issue with using the adapter 300 with the other housing. The grooves 320 will simply be empty in that latter scenario. Naturally, the slots 320 need to be positioned within the interior portion 302 so that the housings on each side of the adapter 300 align with one another.

The side surfaces—first side surfaces 258 and second side surfaces 262 of the polarity keys 250—can engage and be guided by the flat side surfaces 320*a* and 320*b* inside each of the grooves 320 as the housings 200 are inserted into the adapter 300. Each of the flat side surfaces 320*a* and 320*b* are in a plane I and J, respectively, that is parallel to the planes of the side surfaces—planes E-H.

The top surface 320*c* of the grooves 320 may also assist in guiding the vertical movement of the housings 100,200 as they are inserted into the adapter 300. That is, the top surfaces 254 of the polarity keys 250 may engage and be guided by the top surfaces 320*c*.

There is also a second set of grooves or slots 324 on the top side of the adapter 300 that is in communication with the grooves 320 and also with the interior portion 302. The second set of grooves 324 are formed at least in part with guide partitions 330 and also in part by the inside surface 332 of the adapter 300. The guide partitions 330 extend downward from the top wall 322 and extend rearwardly toward the central wall 304, although they need not extend completely in a rearward direction. The guide partitions 330 may each engage two surfaces of the housings 100,200—and in particular, the guide rails 230,232 and the first side surface 224 and the second side surface 226. See FIG. 11. Obviously, the guide partitions 330 that are at the sides of the adapter 300 will only engage one of the housings 100,200. The guide partitions 330 may have a rounded or chamfered front 334 to assist in aligning the housings 100,200 with the ports 306.

There is also a possibility of extending the guide partitions 330 farther downward toward the bottom of the adapter 300. That is, in an alternative aspect of this disclosure, the guide partitions 330 may be joined to the bottom of the adapter 300 with guide partitions 372 to form a solid wall separation between the ports 306. Naturally, the guide partitions would have to be altered so as to extend adjacent to the first side surface 224 and the second side surface 226, and not engage the guide rails 230,232.

There are also another set of grooves 360 in a bottom wall 362 of the adapter 300 and extend from the front 326 of the adapter 300 rearward toward the central wall 304. The grooves 360 need not extend all the way to the central wall 304, but they may. These grooves 360 are to receive the polarity keys 252 on housings 200. Even if there were no polarity keys 250 on the housings (e.g. housing 100), there is no issue with using the adapter 300 with the other housing without the polarity keys 250. The grooves 360 will simply be empty in that latter scenario. Naturally, the slots 360 need to be sized and positioned within the interior portion 302 so that the housings on each side of the adapter 300 align with one another.

The side surfaces—first side surfaces 260 and second side surfaces 264 of the polarity keys 252—can engage and be guided by the flat side surfaces 360*a* and 360*b* inside each of the grooves 360 as the housings 200 are inserted into the adapter 300. Each of the flat side surfaces 320*a* and 320*b* are in a plane K and L, respectively, that is parallel to the planes of the side surfaces—planes E-H. See also FIG. 10.

The bottom surface 360*c* of the grooves 360 may also assist in guiding the vertical movement of the housings 100,200 as they are inserted into the adapter 300. That is, the top surfaces 256 of the polarity keys 252 may engage and be guided by the bottom surface 360*c*.

There is a second set of grooves 370 on the bottom of the adapter 300. As with the top side of the adapter 300, the grooves 370 are also formed at least in part with guide partitions 372 and also in part by the inside surface 332 of the adapter 300. The guide partitions 372 extend upward (partially or fully) from the bottom wall 362 toward the top wall 322, and extend rearwardly toward the central wall 304, although they need not extend completely in a rearward direction.

The guide partitions 372 may each engage two surfaces of the housings 100,200—and in particular, the guide rails 234,236 and the first side surface 244 and the second side surface 246. See FIG. 11. Obviously, the guide partitions 372 that are at the sides of the adapter 300 will only engage one of the housings 100,200. The guide partitions 372 may have a rounded or chamfered front 374 to assist in aligning the housings 100,200 with the ports 306.

There is also a possibility of extending the guide partitions 372 farther upward toward the top of the adapter 300. That is, in an alternative aspect of this disclosure, the guide partitions 372 may be joined to the top of the adapter 300 with guide partitions 330 to form a solid wall separation between the ports 306. Naturally, the guide partitions would have to be altered so as to extend adjacent to the first side surface 244 and the second side surface 246, and not engage the guide rails 234,236.

Figure 12:
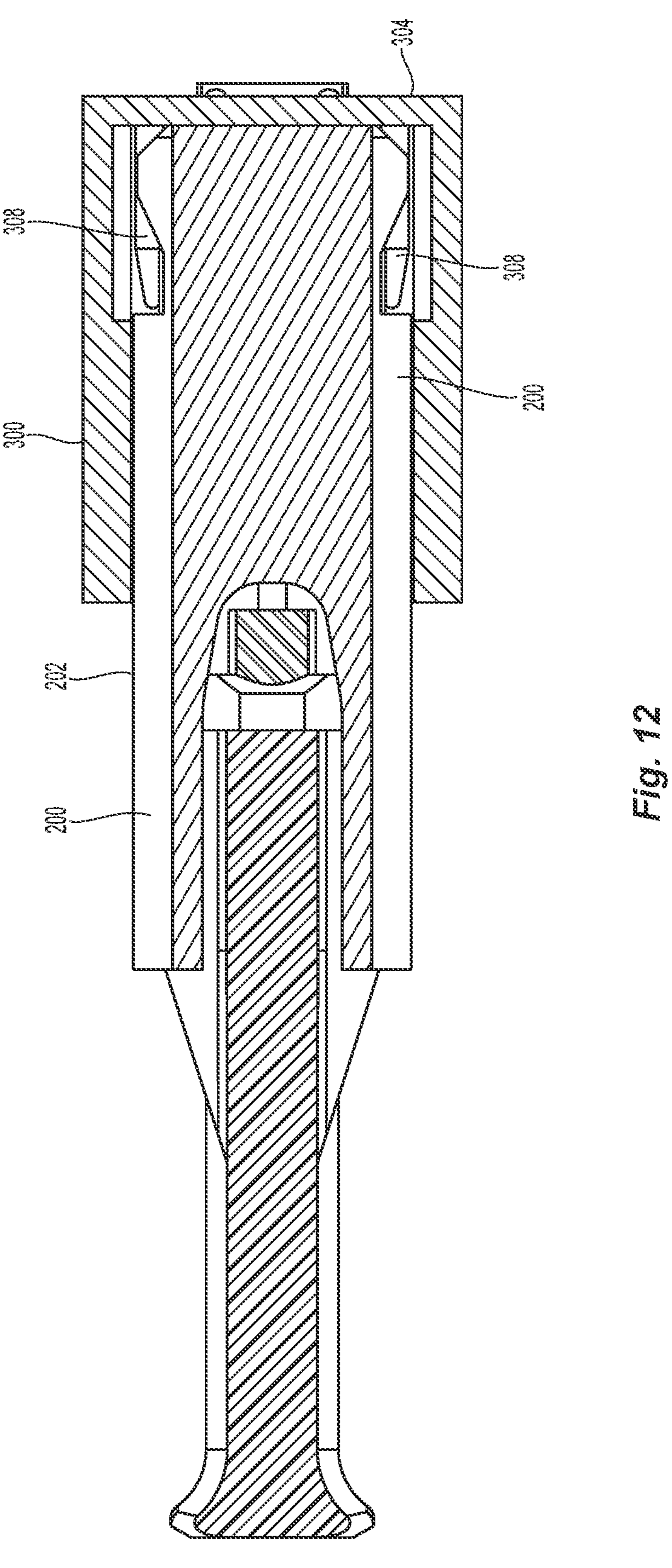
FIG. 12 is a cross section of the fiber-optic connector installed within the adapter in FIG. 11.

FIG. 12 is a cross section of the housing 100 along with most of the connector fully inserted into the adapter 300. Due to the stubbing prevention features described herein, the housing 100 and hence the connector is always positioned within the assigned ports 306 from insertion to mating thereof with another connector, and does not sway laterally to other ports 306, which can cause stubbing.

Figure 13:
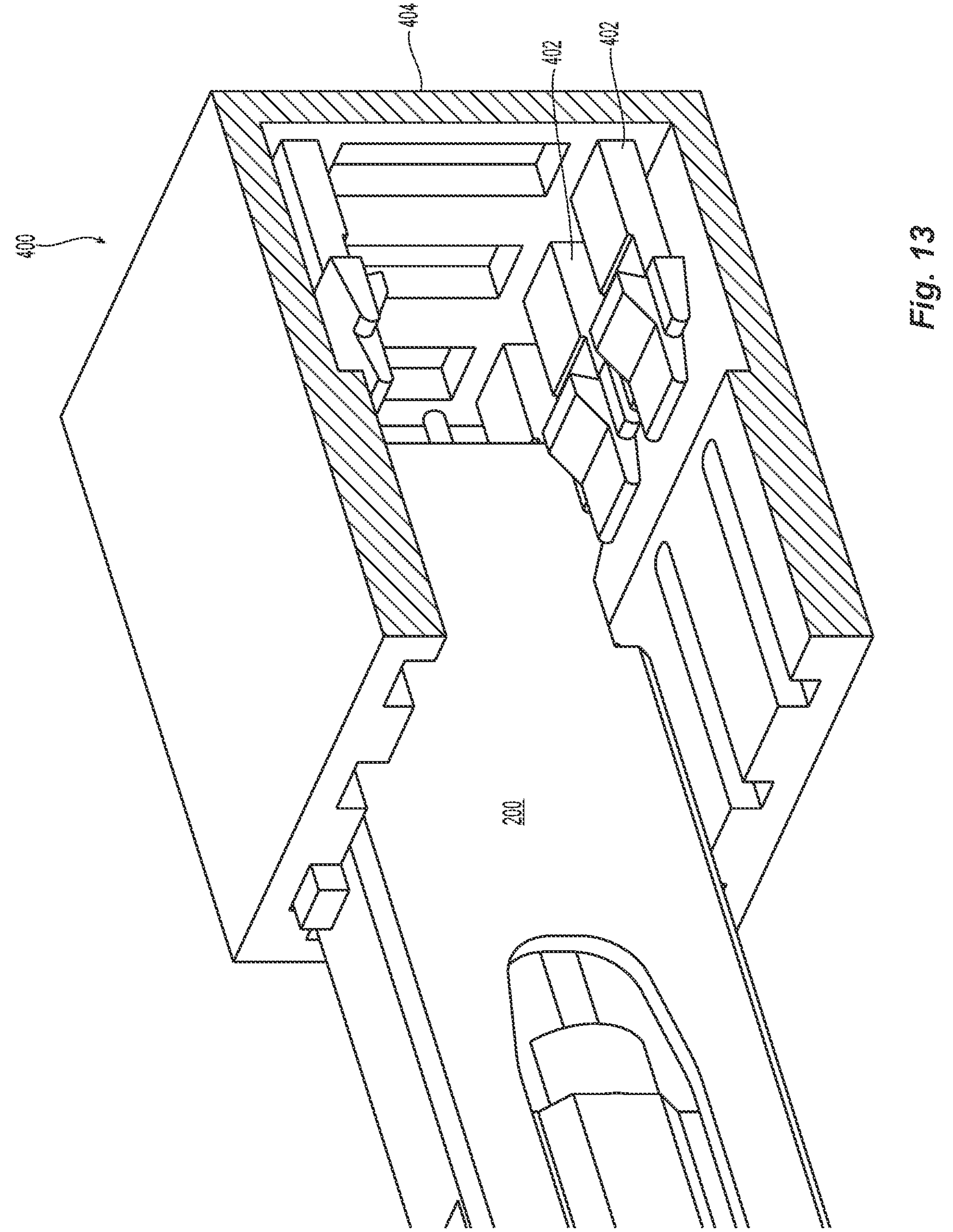
FIG. 13 is another embodiment of a fiber-optic connector and adapter according to the present invention showing latches engaging the fiber-optic connector first.
Figure 14:
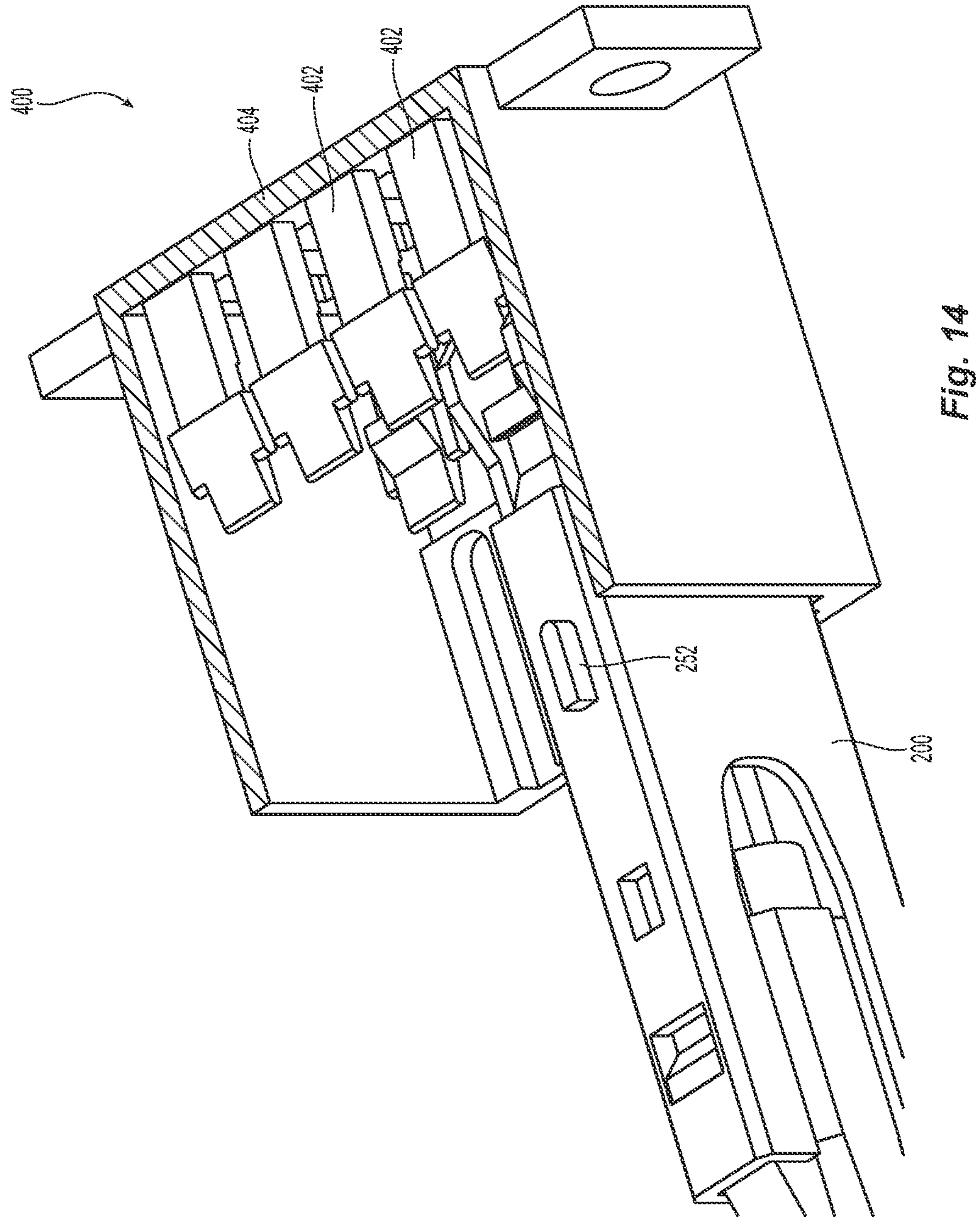
FIG. 14 is a cross sectional view of the fiber-optic connector and adapter in FIG. 13 from an underside.

FIGS. 13 and 14 illustrate a different embodiment of an adapter 400. In this embodiment, there are latches 402 that extend farther forward and away from the central wall 404 than in the prior embodiments. With the latches 402 being engaged to the housing 200 earlier, the latches function to keep the fiber optic connectors and housings 100,200 from engaging other, improper parts of the adapter 400, thereby preventing stubbing. FIG. 14 illustrates that the housing 200 is engaging the latches 402 as the polarity key 252 is just shy of the adapter 400.

From each of these descriptions of the housings 100,200 and the adapter 300, it is clear that the stubbing issue is eliminated as the either the top and bottom walls 102/104/202/204 engage the grooves 324,370 (either or both sets of grooves) shortly after the housings 100,200 are inserted into the adapter 300. The grooves 324,370 prevent the housings 100,200 from moving between ports. As such, it is impossible for there to be any stubbing or unwanted contact within the adapter 300. This is also true of the polarity keys 250,252 and their engagement with the grooves 320,360. Thus, housings 100,200 (and the overall connectors) always align along the longitudinal axis and stay parallel to the longitudinal axis during insertion into the adapter 300 and subsequent final mating, without swaying in the lateral direction or without ever being at a non-zero angle to the longitudinal axis.

The contacts made in the mating of the housings 100,200 and the adapter 300 are a symbiotic relationship of a positive feature and a negative feature. The positive features include additional physical features—projections and surfaces, while the negative features include grooves and surfaces, where material may be considered to have been removed. That is, the polarity keys (the positive feature) aligning with the grooves (the negative feature), and also the guide partitions (the positive feature) with the guide rails (the negative feature) are examples of the stubbing prevention features that modify the conventional SN or SN-MT connectors.

As an alternative to the thicker raised top (102) and the bottom wall (104), it would also be possible to alter the side walls (106/108 and 206/208) so that the side walls extend upward above the top wall 102 and downward beyond the bottom wall (104). The extension of the side walls (106/108 and 206/208) could extend all along the length of the housings (100,200) or only for a portion of the length of the housings (100,200). To allow for control of the orientation of the housings (100,200), one of the side walls (106/108 and 206/208) could extend farther than the other. As an alternative, the extensions may only extend above the top wall or extend only below the bottom wall. The edges of the extensions may be chamfered or rounded to assist in the insertion of the housing into an adapter or other receptacle.

To accommodate such a change to the housings (100,200), the grooves (320) in the housing would then be moved to accommodate the extension of the walls with correspondingly thinner grooves that are positioned closer to the edges of each of the ports. To accommodate the differing heights of the side walls, the grooves may also have different depths to receive the differing height extensions.

As another alternative to the embodiment of the housings 100,200, the housings may have only one of the guide rails, with the other three corners of the housing being rounded or square. The only guide rail may be on the top or the bottom and on the left or the right side of the housing. For example, the housing 100 may have only guide rail 130 and housing 200 may have only guide rail 230. The guide partitions would then be altered to engage the guide rail and the opposing flat side of the housing.

It will be appreciated by one of ordinary skill in the art after reading this disclosure that the examples of such stubbing prevention features (whether on the adapter 300 and/or the connector 100) are equally implementable on duplex connectors or multi-fiber connectors.

An optical assembly with stubbing prevention features for ultra-small form-factor (USFF) fiber-optic connectors or very small form-factor (VSFF) fiber-optic connectors, the optical assembly that includes an adapter having at least one port to mate at least one pair of USFF or VSFF fiber optic connectors and one of a positive stubbing prevention feature or a negative stubbing prevention feature, a first USFF or VSFF fiber optic connector having at least one ferrule receivable inside the adapter; and a second USFF or VSFF fiber optic connector having at least one ferrule receivable inside the adapter opposite the first USFF or VSFF fiber optic connector, wherein each of the first USFF or VSFF fiber optic connector and the second USFF or VSFF fiber optic connector has the other one of the positive stubbing prevention feature and the negative stubbing prevention feature to engage with the adapter without engaging an end face of the at least one ferrule of the first USFF or VSFF fiber optic connector and the second USFF or VSFF fiber optic connector.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. An optical assembly with stubbing prevention features for fiber-optic connectors, the optical assembly comprising:

a first fiber optic connector having at least one ferrule at least partially disposed inside the first fiber optic connector;

a second fiber optic connector having at least one ferrule partially disposed inside the second fiber optic connector opposite the first fiber optic connector, one of the first fiber optic connector and second fiber optic connector having guide pins; and an adapter having at least two ports on each of a first side and a second side of the adapter to mate at least one pair of fiber optic connectors, a first port of the at least two ports on the first side receiving the first fiber optic connector and a first port of the at least two ports on the second side receiving the second fiber optic connector for mating, and a second port of the at least two ports being side-by-side with the first port, respectively, on each of the first side and the second side, wherein each of the first fiber optic connector and the second fiber optic connector has a top wall and a bottom wall separated by opposing side walls, at least one of the top wall and the bottom wall having a first flat surface extending upward from one of the side walls and a second flat surface extending upward from the other of the side walls, the first flat surface and the second flat surface being parallel to and offset from one another, wherein at least one of the top wall and the bottom wall has a third flat surface and a fourth flat surface, the third flat surface and the fourth flat surface being parallel to and offset from one another and disposed between the first flat surface and the second flat surface and on a same top wall or bottom wall as the first flat surface and the second flat surface, and wherein at least one of the flat surfaces engages a corresponding surface in the adapter to prevent unwanted engagement of end faces or guide pins of the at least one ferrule of the first fiber optic connector and the second fiber optic connector disposed within the adapter.

2. The optical assembly according to claim 1, wherein each of the first fiber optic connector and the second fiber optic connector is always positioned within the first port on the first side and the second side, respectively, until the mating of the first fiber optic connector and the second fiber optic connector.

3. The optical assembly according to claim 1, wherein the third flat surface and the fourth flat surface are on a polarity key extending upward from one of the top wall and the bottom wall.

4. The optical assembly according to claim 1, wherein the flat surfaces extend from both the top wall and the bottom wall.

5. The optical assembly according to claim 1, wherein the first and the second fiber optic connectors engage a latch disposed within the adapter before the guide pins or front faces of the respective at least one ferrule of each of the first and the second fiber optic connectors mate with one another.

6. The optical assembly according to claim 1, wherein the at least two ports on each of the first side and the second side of the adapter each have at least two flat surfaces within a central opening of the adapter to engage at least two of the flat surfaces on the first and the second fiber optic connectors.

7. The optical assembly according to claim 6, wherein the at least two flat surfaces within the central opening of the adapter to engage at least two of the flat surfaces on the first and the second fiber optic connectors are on guide partitions extending from the top wall and bottom wall.

8. The optical assembly according to claim 1, wherein the at least two ports on each of the first side and the second side of the adapter each have at least four flat surfaces within a central opening of the adapter to engage four of the flat surfaces on the first and the second fiber optic connectors.

9. The optical assembly according to claim 1, wherein each of the at least two ports of the adapter and the first and the second fiber optic connectors have four flat surfaces.

10. A fiber optic connector comprising:

a top wall;

a bottom wall;

opposing side walls that separate the top wall from the bottom wall, wherein at least one of the top wall and the bottom wall having a first flat surface extending upward from one of the side walls and a second flat surface extending upward from the other of the side walls, the first flat surface and the second flat surface being parallel to and offset from one another, and wherein at least one of the top wall and bottom wall has a third flat surface and a fourth flat surface, the third flat surface and the fourth flat surface being parallel to and offset from one another and disposed between the first flat surface and the second flat surface and on a same top wall or same bottom wall as the first flat surface and the second flat surface, wherein at least one of the flat surfaces engages a corresponding surface in an adapter to prevent unwanted engagement of end faces or guide pins of an at least one ferrule of the fiber optic connector disposed within the adapter.

11. The fiber optic connector according to claim 10, wherein the flat surfaces extend from both the top wall and the bottom wall.

12. The fiber optic connector according to claim 10, wherein the third flat surface and a fourth flat surface are on a polarity key extending upward from one of the top wall and the bottom wall.

13. An optical assembly with stubbing prevention features for fiber-optic connectors, the optical assembly comprising:

an adapter having at least one port to mate at least one pair of fiber optic connectors, the adapter having one of a projection and a receiver to prevent stubbing;

a first fiber optic connector of the at least one pair of fiber optic connectors having at least one ferrule at least partially disposed inside the first fiber optic connector; and a second fiber optic connector of the at least one pair of fiber optic connectors having at least one ferrule partially disposed inside the adapter opposite the first fiber optic connector, wherein each of the first fiber optic connector and the second fiber optic connector has the other of the projection and the receiver located rearward of a latch receptacle thereof to prevent stubbing to prevent unwanted engagement of the end faces or guide pins of the at least one ferrule of the first fiber optic connector and the second fiber optic connector disposed within the adapter.

14. The optical assembly according to claim 13, wherein the projection is a projection extending from a top portion of a housing of each of the at least one pair of fiber optic connectors.

15. The optical assembly according to claim 13, wherein the receiver is a groove within the adapter.

16. The optical assembly according to claim 13, wherein the adapter has a central wall with openings for at least a portion of the at least one ferrule, respectively, of each of the at least one pair of fiber optic connectors to pass therethrough.

17. The optical assembly according to claim 13, wherein the projection is a guide partition extending from a top wall of the adapter into an opening in the adapter toward the bottom wall or is a guide partition extending from a bottom wall of the adapter into the opening in the adapter toward the top wall.

18. The optical assembly according to claim 13, wherein the receiver is a guide rail on an outside portion of each of the at least one pair of fiber optic connectors.

* * * * *